United States Patent
Levinson

(10) Patent No.: US 7,683,775 B2
(45) Date of Patent: Mar. 23, 2010

(54) LOW POWER PULSE MODULATION COMMUNICATION IN MESH NETWORKS WITH MODULAR SENSORS

(76) Inventor: Frank Levinson, P.O. Box 37, Syracuse, IN (US) 46567

( * ) Notice: Subject to any disclaimer, the term of this patent is extended or adjusted under 35 U.S.C. 154(b) by 530 days.

(21) Appl. No.: 11/565,420

(22) Filed: Nov. 30, 2006

(65) Prior Publication Data

US 2007/0123282 A1 May 31, 2007

Related U.S. Application Data

(60) Provisional application No. 60/741,174, filed on Nov. 30, 2005.

(51) Int. Cl.
*G08B 19/00* (2006.01)
*G08B 23/00* (2006.01)

(52) U.S. Cl. .............. 340/521; 340/531; 340/539.17; 340/539.1; 340/539.28

(58) Field of Classification Search .............. 340/521
See application file for complete search history.

(56) References Cited

U.S. PATENT DOCUMENTS 5,763,943 A * 6/1998 Baker et al. ............. 257/686
6,878,643 B2 * 4/2005 Krulevitch et al. ........ 438/780
6,889,165 B2 * 5/2005 Lind et al. ................ 702/183

OTHER PUBLICATIONS

NYS Museum Press Release, *National Geographic Features NYS Museum Scientists Research*, Oct. 30, 2006.
Chris Carroll, *Following the Stealth Hunter*, 66 National Geographic, Nov. 2005, pp. 66-77.

* cited by examiner

*Primary Examiner*—Donnie L Crosland
(74) *Attorney, Agent, or Firm*—Workman Nydegger

(57) ABSTRACT

A modular sensor architecture. A sensor includes multiple planes that are in electrical communication. A power plane provides a power source and a communications module that can be optical and/or electrical in nature. The power source can be upgraded using optical power delivered over an optical fiber. The sensor can also both transmit/receive data over the optical fiber. A processing plane provides memory and processing power. The processing plane can be updated/upgraded via the communications module or the optical fiber. A sensor plane includes multiple sensors. Deployed sensors can transmit and receive data or programming using mesh networks and using low power pulse modulation.

7 Claims, 7 Drawing Sheets

LOW POWER PULSE MODULATION COMMUNICATION IN MESH NETWORKS WITH MODULAR SENSORS

CROSS-REFERENCE TO RELATED APPLICATIONS

This application claims the benefit of U.S. Provisional Application Ser. No. 60/741,174, filed Nov. 30, 2005, and is incorporated herein in its entirety by reference.

BACKGROUND OF THE INVENTION

1. The Field of the Invention

The present invention relates to the field of communication networks using sensors. More particularly, embodiments of the invention relate to the field of modular sensors including sensors that use low power pulse modulation over mesh networks.

2. The Relevant Technology

In general, a sensor is a device that generates an output based on some type of input. Sensors have been developed that can respond to a wide range of inputs including, by way of example, nuclear, electromagnetic, chemical, biological, thermal, and mechanical inputs. The ability to respond to many different types of input has made sensors an important aspect of technology. As a result, sensors are increasingly used in a wide range of activities that include, for example, medicinal purposes, environmental purposes, commercial endeavors, industrial activities and biological functions.

In each of these types of activities, there is a growing dependence on the ability to collect, monitor, and analyze data. Sensors help in this endeavor by facilitating and improving the process of collecting and analyzing the data. Sensors improve the ability to collect and analyze data for several reasons. For instance, sensors are usually able to detect a situation more rapidly than a person can detect the same situation. Sensors can also detect subtle changes and detect minute quantities that a person cannot discern. In addition, sensors can be deployed in locations and situations where it is often impractical to deploy people.

The data collected by sensors can be used in various ways. Sensor data can be collected over time to monitor trends or to measure changes over time. For example, traffic patterns are collected with sensors over time before implementing a form of traffic control. Collecting the traffic data over time enables a traffic control system to be more efficient. Sensors can also collect data that can be analyzed and used to make quick decisions. For example, automobiles have multiple sensors that collect information that is used to determine when an air bag should be deployed. Clearly, the air bag should not be deployed unnecessarily but only when an accident occurs. As a result, the data collected by the multiple sensors is analyzed collectively to distinguish, for instance, between a true accident and when someone is simply leaning forward.

While sensors are useful in collecting, monitoring, and analyzing data, it is often difficult and time consuming to create a sensor that easily adapts to use in a new environment. Generally, conventional sensors are created with components that are not easily modified or replaced. Thus, components may not be readily substituted with other components to create a specific sensor configuration. Furthermore, conventional sensors are unable to support the hardware and software components that are required for multiple sensor configurations, meaning that new hardware and software must be specifically designed for each new sensor configuration. Thus, the design and implementation of new sensors typically requires great time and expense for each new sensor configuration.

In addition to difficulties arising from the interchangeability and customization of the sensor components, conventional sensors lack the ability to effectively use developing wireless and optical transmission technology. Generally, the use of systems implementing such technology requires a substantial amount of power, meaning that conventional sensors using wireless and/or optical transmission systems quickly exhaust the sensors limited power supply and must be replaced regularly.

Thus, there is a need for a system and method of using sensors that are modular, meaning that they may be easily created and tailored for new uses and environments. Furthermore, there is a need for such a system with reduced power requirements, such that the sensors may continue to operate for longer periods of time than sensors in conventional systems.

BRIEF SUMMARY OF THE INVENTION

These and other limitations are overcome by embodiments of the invention which relate to sensors including a modular sensor architecture. The modular sensor architecture includes planes that can be developed and fabricated independently of other planes. This enables planes to be interchanged to provide variable functionality. In addition, the planes may include processing components that can be reprogrammed or updated to perform different or additional tasks. In some embodiments, the power source of the sensor is rechargeable or can be powered using optical power.

The modular structure of a sensor therefore provides configurable functionality. In one example of the modular sensor architecture, a sensor may include a power plane, a processing plane, and a sensing plane. The power plane includes a power supply, which may be rechargeable. For example, an optical fiber may be connected or tethered with the sensor's power plane, which includes a semiconductor device with multiple photodiodes. Light incident on the photodiodes can generate a current that can be used to power the sensor, recharge the battery, or bias a laser which may also be included in the semiconductor device.

The power plane may also include a communication module. The communication module may include the laser, which can be modulated to transmit data over the tethered optical fiber. The communication module may also be an RF module.

The processing plane typically provides the processing power required by the sensor. The processing plane may include a microprocessor, memory (RAM, FLASH, etc.), Field Programmable Gate Arrays (FPGAs), and the like. The processing plane can be reprogrammed remotely to make the sensor perform new or additional functionality. The processing plane can be reprogrammed using data transmitted over the tethered optical fiber, for example and/or by receiving RF data remotely.

The sensing plane includes a set of sensors that collect certain data. The modular nature of the sensor architecture permits different sensor sets to be formulated. The sensing planes can be fabricated with similar or identical interfaces such that the sensing planes can have electrical communication with other planes regardless of the specific sensor set. The processing plane can be programmed to accommodate the various sensor set as well. During fabrication, the appropriate sensor set can be selected and integrated with the modular sensor.

In one embodiment, the various planes are connected by flex circuits. In another embodiment, the various components of the sensor module are formed in an integrated circuit structure. This can make the device robust and provide a predictable platform for RF technologies. Many of the components in the IC structure are pluggable. A uniform sensor interface can therefore provide a platform that is adaptable to situations that require different sensor sets or platforms.

The ability of the sensors described herein to communicate use an ultra wide band (UWB). In one embodiment, the data rate is dropped. This enables lower power to be used while achieving longer transmission distances. Various forms of pulse modulation can be employed, for example the amplitude may vary using pulse amplitude modulation (PAM), the duration may vary using pulse width modulation (PWM), the presence of the pulses in pulse code modulation (PCM), the time delay between pulses in a sequence using pulse position modulation (PPM), the relative density of the pulses using pulse density modulation (PDM), or other methods known in the art.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to systems and methods for monitoring or collecting data from sensors operating in varied environments. The data monitored or collected from an environment includes the use of sensors including remote sensors including mobile intelligent sensing devices. Embodiments of the invention include a modular sensor architecture that includes stackable planes. Each plane can be adapted for specific functionality. As a result, multiple sensor configurations can be selected by swapping out one plane for another. Once the appropriate set of planes are selected for a given application, the planes are assembled into an integrated unit. This is achieved, for example, by bonding the planes together. When the planes are bonded together or otherwise assembled, the various components in the respective planes become electrically connected. Alternatively, the electrical connections can be achieved using flex circuits between planes and the like. This enables interplane communication and permits data collected from the sensors, for example, to be accessible to other components within the sensor structure.

The architecture of the modular sensors and the interplane communication also accommodates systems and methods for powering the sensor or for renewing or recharging a sensor's power supply. Because the power supply is renewable or rechargeable, the sensor can both remain in a remote location and also have the ability to transmit/receive data without draining the power supply and consequently shortening the life of the sensor.

The modular sensors are used, in one example, to form a network of sensors. This network of sensors can use or form mesh networks that enable data monitored or collected by the sensors to be transmitted back to a common server. Over time as the data is collected, the server can process and analyze the data. Further, the use of mesh networks and the use of low power communications enables the power supplies of the sensors to be extended, resulting in more comprehensive data collection and monitoring.

Modular Sensor Architecture

Figure 1:
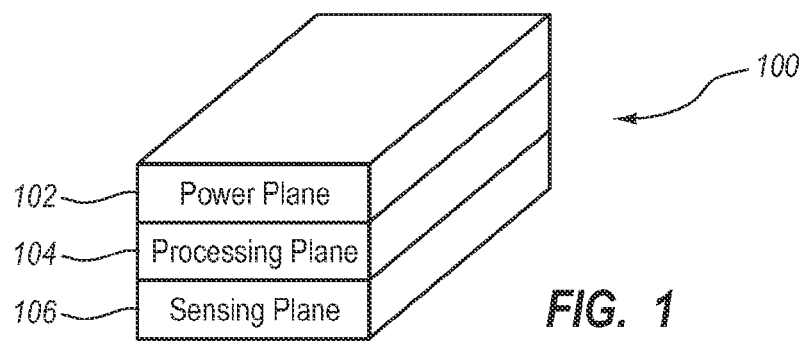
FIG. 1 illustrates one embodiment of a perspective view of a modular sensor.

FIG. 1 illustrates one embodiment of a sensor 100. The sensor 100 is modular and can include multiple planes. The planes of the sensor 100 are typically independent of each other and can therefore be assembled in different configurations by changing out one plane for another. If one of the planes includes a sensor or a set of sensors, for example, then the capability of the sensor 100 to collect or monitor data can be changed by simply providing a plane with different sensors. The various planes of the sensor 100 are stackable and provide interplane communication when assembled together. The interplane communication accommodates different sensor configurations and the like.

Figure 2:
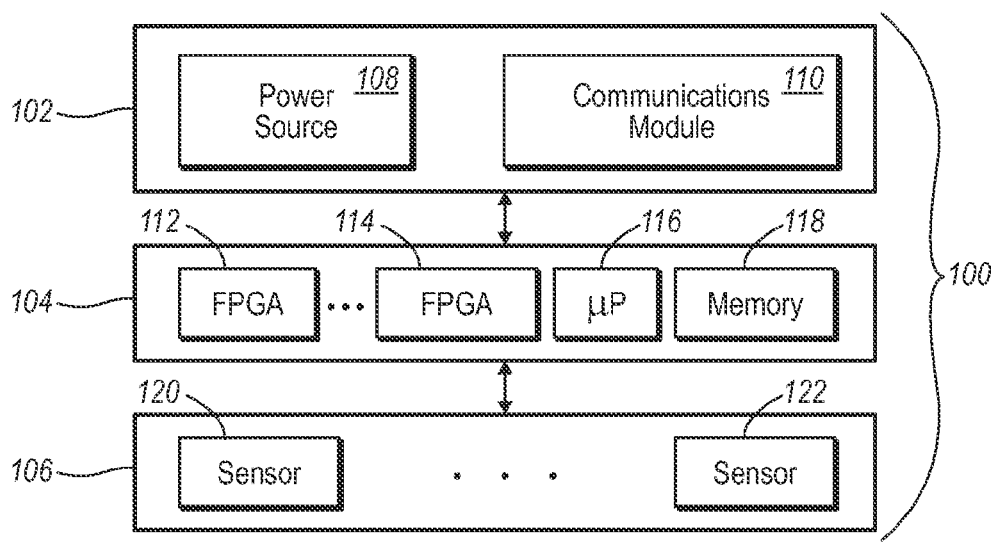
FIG. 2 illustrates examples of planes in a modular sensor architecture including a power plane, a processing plane, and a sensor plane.

With reference to FIGS. 1 and 2, one embodiment of the sensor 100 includes a power plane 102, a processing plane 104, and a sensing plane 106. These planes 102, 104, and 106 can be assembled together to form an integrated sensor 100. The various components within the respective planes can be arranged such that interplane communication is possible even when a new plane is selected for inclusion in a particular sensor. Additional planes can be added to provide additional functionality or for other reasons such as forming a hermetic seal for the sensor's components.

The power plane 102 includes components that provide power to the sensor 100. The power source 108 provides the power required both the processing plane 104 and the sensing plane 106. The components in power plane 102 may also include a communication module 110 that is powered by the power source 108. In some embodiments, the power source 108 is renewable or rechargeable. A renewable or rechargeable power source 108 enables the communication module 110 to transmit more effectively and with more power because the power source 108 can be recharged. In one example, the sensor 100 can communicate wirelessly. For example, the sensor 100 can communicate using a BlueTooth™ Radio Module or similar technology. Using BlueTooth™ technology, the sensors may form a piconet or similar network that allows the sensors to communicate and transfer data to other sensors within the network. This facilitates the collection of data in real time. Advantageously, data can be collected remotely without having to physically access the sensor and connect it to another device.

The processing plane 104 may include various combinations of components that are used to process or store the data collected or provided by sensors in the sensing plane 106. In this example, the processing plane 104 includes a microprocessor 116 and associated memory 118. The memory 118 may include volatile (e.g., RAM) and/or nonvolatile memory (e.g., FLASH memory). The nonvolatile memory can be used to store, by way of example, the analyzed or processed sensor data as well as other code executed by microprocessor 116. One of skill in the art can appreciate that the microprocessor 116 may be implemented as another device such as a microcontroller and the like.

The processing plane 104 may also include one or more field programmable gate arrays (FPGAs). The FPGAs can be either digital or analog in nature and can therefore be configured to perform various tasks. The FPGAs can provide, by way of example and not limitation, analog to digital converters, digital to analog converters, timers, counters, amplifiers, filters, pulse width modulators, and the like or any combination thereof. In one embodiment, the processing plane 104 may include a PSoC™ Mixed Signal Array available from Cypress MicroSystems. The PSoC is a programmable processor with integrated storage (e.g., flash memory) and FPGAs that are both analog and digital. This aspect can provide flexible sensor interfaces.

Because the sensor 100 can receive data remotely, the processing plane can be configured or updated remotely. This enables code stored in the processing plane to be updated or altered. In one embodiment, the sensor can be remotely reprogrammed to perform new or additional functions. For example, the analog portion of the FPGSs in the processing plane can be re-programmed directly or remotely.

The sensing plane 106 includes one or more sensors that collect data. The data collected by the sensors in the sensing plane 106 can be processed by the processing plane 104 and communicated to a remote location through the communication module 110 provided in the power plane 102. Alternatively, the processed data can be stored in the memory 118 until it is retrieved at a later date either remotely or directly. Sensors that can be included in the sensing plane 106 include, but are not limited to, biological sensors, chemical sensors, physical sensors (temperature, speed, pressure, etc.), electromagnetic sensors, nuclear sensors, and the like or any combination thereof.

Figure 3:
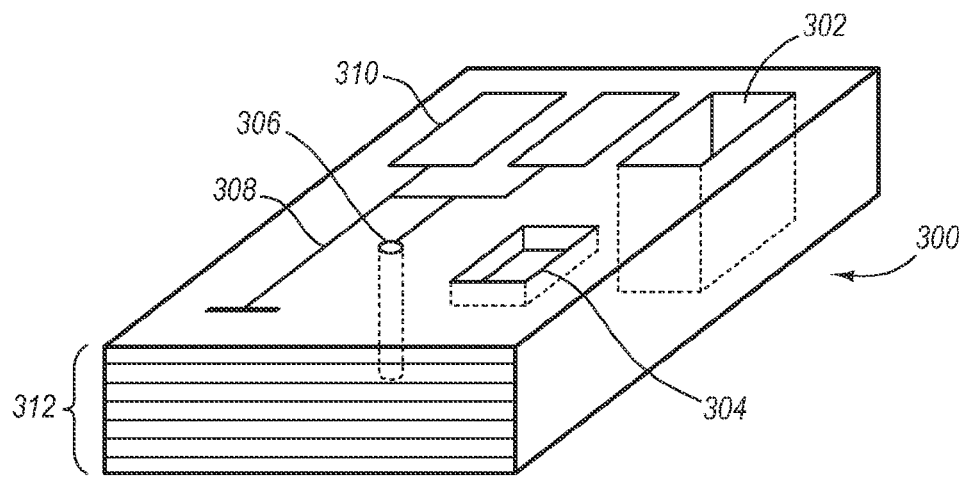
FIG. 3 illustrates one embodiment of a plane that includes multiple layers with cavities for accommodating components that are included in a sensor.

FIG. 3 illustrates an example of a plane 300 that may be included in the sensor 100. In one embodiment, the plane 300 may be formed from a ceramic material known in the art as "green clay" and may include multiple layers 312. Conductive paths 308 and other components 310 can be located on each of the layers 312. The plane 300 may also include vias 306 that enable electrical communication between the layers 312 as required.

The plane 300 also includes cavities 302 and 304. The cavity 302 passes completely through the plane 300 while the cavity 304 only partially extends into the plane 300. The cavities 302 and 304 may be used to hold various components that may not be an integral part of a particular layer like the conductive paths. The cavities 302 and 304 can hold more bulky components yet still permit the assembled sensor to have a compact and common shape and size if desired.

For example in the plane 104 shown in FIGS. 1 and 2, the FPGA 112 and 114, the microprocessor 116, and the memory 118 may each be placed within a cavity such as the cavity 302 or 304. Various types of connections can be used to connect components placed within the various cavities 302, 304 of the plane 300. Also, placing components within the cavities ensures that the layers remain stackable and can be fabricated in a uniform manner even though the various planes include different components including different sensors.

Figure 4A:
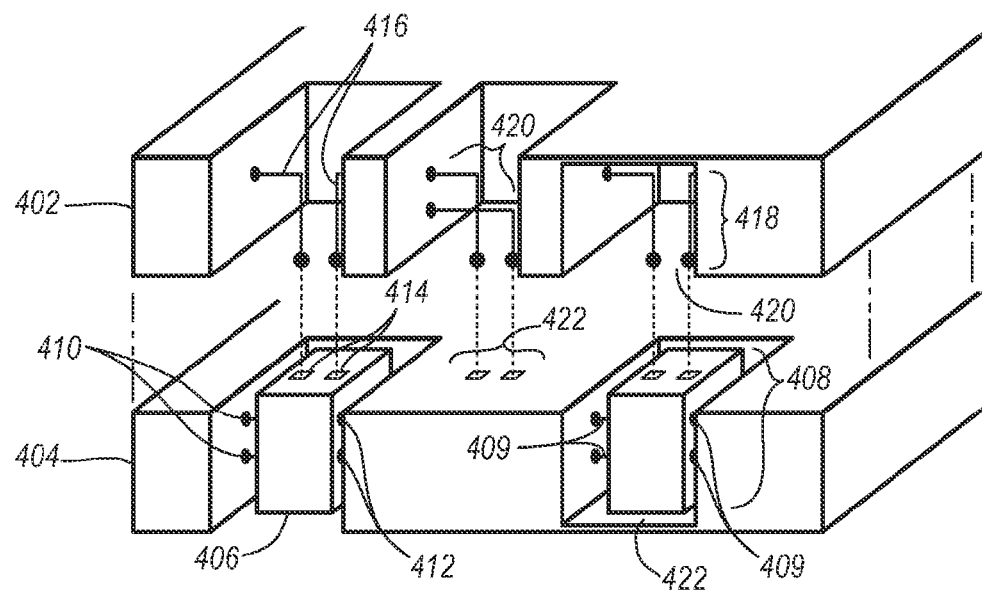
FIG. 4A illustrates one embodiment of electrical connections between planes and an example of a hermetic seal formed by the coupled planes.

FIG. 4A illustrates an example of interplane communication in a sensor. FIG. 4A illustrates a processing plane 402 and a sensing plane 404 before the planes are integrated or bonded together. The sensing plane 404 includes a sensor 406 and a sensor 408 that are each disposed within a corresponding cavity of the sensing plane 404. The sensor 406 is connected to one or more layers of the sensing plane through the connections 410 and 412. The connections 410 and 412 may include, by way of example, I²C, power, and the like. The sensor 408 has similar connections 409.

The processing plane 402 has leads 416 and 418 that are formed within corresponding cavities of plane 402. In this example, the leads 416 are configured to come into contact with the contacts 414 when the processing plane 402 is connected or bonded with the sensing plane 404. In another embodiment, the leads 420 can contact the contacts 422, which may be connected with one of the sensors 406 and or 408 through various layers of the plane 404.

When the sensor is fabricated, the various planes are positioned such that the leads in one plane match up with the contacts in another plane. Then, the planes are bonded or otherwise connected together to form a sensor module (also referred to generally as sensor). During fabrication of the sensor module or of a particular plane when one plane is bonded to another plane, each lead may be secured to a corresponding contact by welding or soldering to ensure a proper electrical contact. Each plane may have an insulation layer to ensure that interplane communication occurs only where specified. The planes can be sealed together to ensure that leads and contacts in respective planes are in adequate contact. Advantageously, some of the components that are placed within cavities of the planes are hermetically sealed. FIG. 4A, for example, illustrates that the cavity 420 and the cavity 422 are partial cavities and that the sensor 408 can be hermetically sealed inside the sensor when the planes 402 and 404 are bonded together.

Figure 4C:
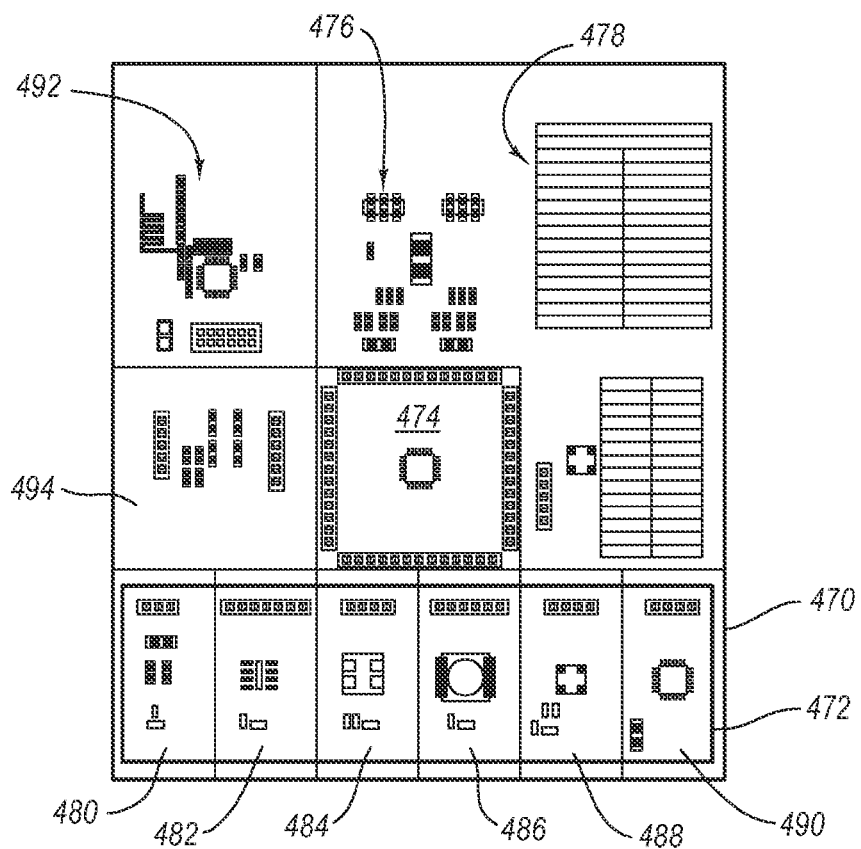
FIG. 4C illustrates another embodiment of an integrated circuit modular sensor.
Figure 4B:
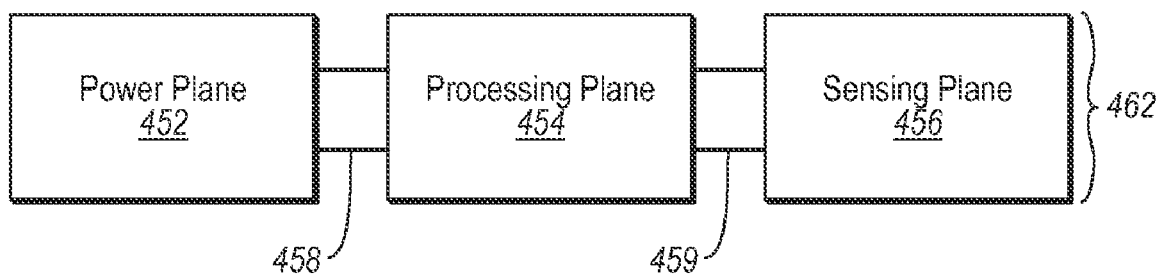
FIG. 4B illustrates another embodiment of a modular sensor with flex circuit connectors.
Figure 4B:
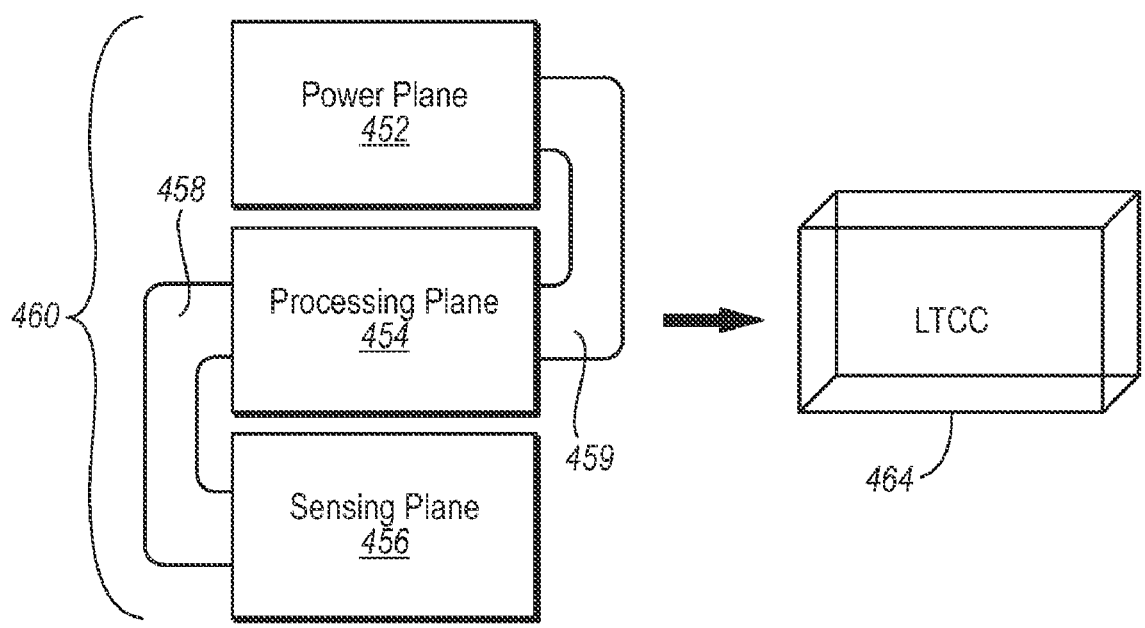

FIG. 4B illustrates another embodiment of a modular sensor. The embodiment of the sensor module 450 illustrated in FIG. 4B includes the communication and power plane 452, the storage and processing plane 454 and the sensing plane 456. The connections between planes of the sensor module 450, however, are achieved using flex circuits 458 and 459. The flex circuit 458 connects the power plane 452 with the processing plane 454 and the flex circuit 459 connects the processing plane 454 with the sensing plane 456. The flex circuits 458, 459 enable power signals, data signals, and control signals to be shared between the planes 452, 454, and 456. The flex circuits 458 and 459 mechanically and electrically connect the respective planes in one embodiment. The flex circuits 458 and 459 also enable the planes 452, 454, and 456 to be stacked if desired to retain a common shape.

The sensor module 450 can exist in a planar state 462. Alternatively, the flex circuits 458 and 459 enable a packaged state 460 where the planes are stacked as previously described. In this example, the planes of the sensor 462 can be folded at the flex circuits to form a structure that may have, by way of example and not limitation, a volume of in the range of 1 to 4 cubic centimeters or less. Of course, embodiments of the invention contemplate larger volumes for the sensor modules where required or desired or smaller volumes as well. In addition, the sensor module 450 can incorporate ceramic substrate technology such as Low Temperature Co-Fired Ceramics (LTCC). The finished sensor module 464 illustrates the sensor module 450 incorporating the LTCC ceramics. Ceramics can be used in each plane individually or during the fabrication of the packaged state of the sensor module 450.

Using ceramic substrates has the advantages of smaller sizes for sensor modules, hermetic aspects to various sensors or other components in the sensor module, and the like. The finished sensor module 464 can include multiple ceramic layers for each plane. The ceramic aspect of the sensor module 464 provides high performance dielectrics, and enhances RF performance.

FIG. 4C illustrates an integrated circuit (IC) configuration of the modular sensor. The IC sensor module 470 includes a processor 474 that provides computing power and enables the sensor data to be processed. The sensors 472 are arranged on the board and can be pluggable if desired. Each of the sensors 472 may optionally have a common interface. This enables the module 470 to be manufactured with various sensor platforms by simply selecting the specific sensors for a given application. Alternatively, each type of sensor can be provided with a specific interface. In this example, the sensors 472 of the sensor 470 include a recorder 480, a color sensor 482, a humidifier/temperature sensor 484, a pressure sensor 486, an accelerator 488, and a compass 490.

The IC sensor module 470 further includes a battery 478 as well as a solar cell 476. The solar cell 476 can recharge the battery 478 or be used for other purposes. A radio module 492 is also included in this embodiment. The power necessary to operate the interface 494 as well as the radio 492 can be received from the solar cells 476 and/or the battery 478.

The radio module 492 can be adapted to transmit according to various protocols and/or frequency bands. In one example, the radio module 492 uses Bluetooth and can transmit relatively short distances. In another example, the radio module 492 transmits using ultra wide band using low power modulation. This reduced power requirements of the sensor and can increase transmission range.

The IC sensor module 470 has an interface 474. The interface 474 can be electrical in nature or optical in nature as described herein. As described herein, when the interface 494 includes a photocell, the IC sensor module 470 can be charged using a received optical power signal that converts received laser light into a charging trickle current for the battery. The interface may optionally represent a port such that another device can quickly be inserted into the port and automatically extract any of the collected data from the IC sensor module. Embodiments of the interface and the ability of a sensor to receive optical power are described in more detail below.

Sensor Power Source

Some sensors typically require a power source such as a battery. The battery, as previously described, has a limited life. Embodiments of the invention, however, deliver optical power to the sensors that can be converted to an electrical form. The optical power can also be modulated such that both data and power can be delivered to a sensor on the same optical signal.

Figure 5:
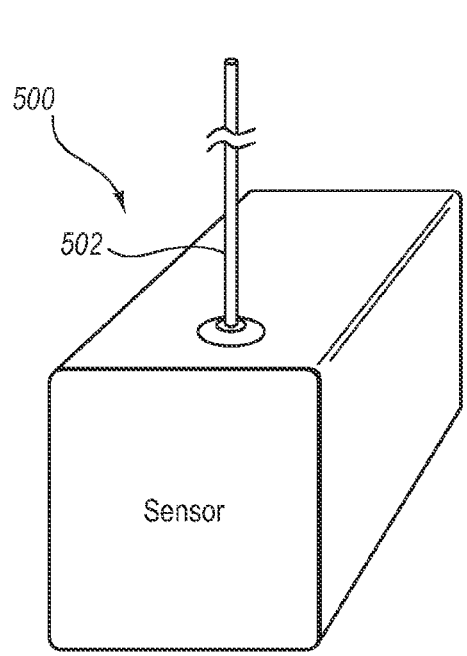
FIG. 5 illustrates one embodiment of a sensor with a tethered optical fiber.

In one embodiment, an optical fiber is used to deliver the optical power to a sensor and FIG. 5 illustrates an example of a sensor tethered to an optical fiber. The sensor 500 is tethered or coupled with a cable that is an optical fiber 502 in this example. Through the optical fiber 502, optical power can be delivered to the sensor. The tether enables the sensor to be placed in a remote location. A person can then interface with the sensor through the other end of the optical fiber that is typically placed in a more convenient location than the sensor itself.

The optical power can be converted to electrical power to trickle charge a power source such as a battery, for example. The ability to optically recharge a battery enables the sensor to transmit and receive data without fear of shortening the life of the sensor as is the case in conventional sensors that only have a limited battery life. The signal used to deliver optical power to the sensor can also be modulated and thus carry data to the sensor to reprogram or upgrade the capabilities of the sensor.

The optical fiber 502 further enables the sensor to be placed in locations where an electrical cable is unsuitable, such as in refineries, petrochemical towers or other places where potential sparks are unwanted. In fact, a tethered sensor can be used in a variety of environments including, by way of example and not limitation, ocean floors, oil and gas fields, geographic structures such as volcanoes, animal habitats, ecosystems and the like. The sensor 500, once placed in an environment, can then be accessed through the optical fiber 502 without having to disturb the environment.

Figure 6:
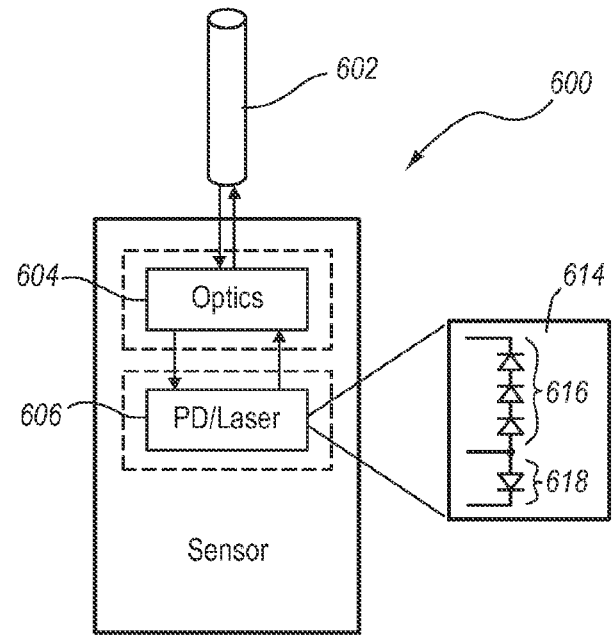
FIG. 6 illustrates one embodiment of a more detailed view of an optical fiber tethered to a sensor such that optical power can be delivered to the sensor.

FIG. 6 illustrates another example of a sensor tethered to an optical fiber. The sensor 600 includes an optical device 606 that includes both a photodiode and a laser. In this example, the optical device 606 is an integrated semiconductor device that is grown in series. The box 614 illustrates that the optical device 606 includes, in this example, a series of photodiodes 616 and a semiconductor laser 618 grown monolithically. The optical device 606 may also include a transistor that can be turned on/off to control when the laser is active. The transistor may also control the ability to direct the current in the photodiodes to the battery, to the laser, or to other portions of the sensor. This may increase the amount of current available for charging the power supply or for other purposes of the sensor.

In this example, the photodiodes 616 are not biased and the fiber 602 is configured to emit light that is incident on the photodiodes 616. The incident light, under the photovoltaic effect, generates current in the photodiodes 616 that can be used, for example, to charge a battery in the sensor. The voltage generated across the photodiodes by the incident light from the optical fiber 602 may also be used to bias the laser 618, which can be either an edge emitting laser or a vertical cavity surface emitting laser. The laser 618 can be used to transmit data back through the fiber 602. The device 606 therefore enables communication to and from the sensor 600 through a single optical fiber.

The materials selected to fabricate the optical device 606 may be selected based on the associated wavelengths. For example, the photodiodes may be optimized to detect wavelengths on the order of 850 or 980 nanometers. The laser may use a material system optimized to emit light on the order of 1310 or 1550 nanometers. The material system for both the photodiodes and the laser may be the same. Material systems for 850 or 980 nanometers include GaAs and material systems for 1310 or 1550 nanometers include InGaAsP. The specific material system selected for the photodiodes and the laser may depend, for example, on the length of the optical fiber. One of skill in the art can appreciate that other material systems may be selected to fabricate the optical device 606. One embodiment of the optical device 606 is further described in U.S. Publication No. US 2004/0208600 A1 and in U.S. Publication No. US 2003/0223756 A1, which are both hereby incorporated by reference.

Thus, the fiber 602 is a single fiber that can be used to optically provide power to the sensor 600, deliver data to the sensor 600, and receive data from the sensor 600. Through the fiber 602, the sensor 600 can receive data needed to upgrade or reprogram the sensor. The ability to reprogram or upgrade the sensor can further be achieved using code stored in the memory of the sensor.

The optics 604 are configured to direct light emitted from the fiber 602 to the photodiode portion of the device 606 and to direct light emitted by the laser portion of the device 606 back into the laser. As previously stated, the optical power delivered to the sensor over the fiber 602 can also be modulated to carry data to the sensor. Changes in the photovoltaic effect can be used to detect the data being delivered to the sensor. In yet another embodiment, the optics 604 may direct the incident light to a transimpedance amplifier used to convert the input optical signal into an electrical signal.

For transmission purposes, the laser light can be modulated by the sensor itself to send data back through the fiber 602. In some embodiments, the battery power of the sensor may be used to assist in the reception and transmission of data. The photodiodes, however, can be used to charge the battery at other times when not receiving data to ensure that the sensor has sufficient power, for example, to collect, receive, transmit, and analyze data.

The device 606 as well as the optics 604 can be integrated with the sensor, for example, by being incorporated into the power plane. Connections to other planes in the sensor are achieved as previously described.

Figure 7:
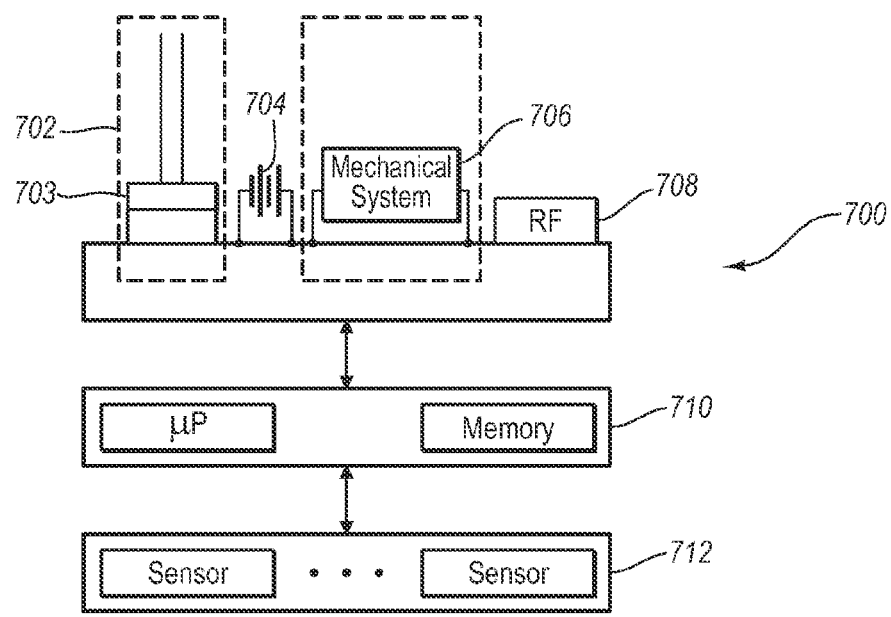
FIG. 7 illustrates multiple examples of components used to provide or recharge power to enable the transmission and reception of data in a sensor.

FIG. 7 illustrates another embodiment of a sensor 700 and illustrates additional or alternative power sources. The sensor 700 includes a tethered fiber 702 that can be used as described previously to communicate with the sensor 700 as well as provide power for the sensor 700. The fiber 702, through the photodiodes and laser 703, can charge the battery 704.

The sensor 700 may also have a mechanical system 706 in addition to or in place of the tethered fiber 702. The mechanical system 706 can be adapted to charge the battery 704. The mechanical system 706 may store energy as the sensor 700 moves (when connected to a moving object such as an animal or bird) and then discharge the stored energy into the battery when a threshold is achieved. Also, the sensor 700 may include an RF module 708 for receiving/transmitting data rather than receiving/transmitting data through the fiber 702.

The sensor described can be made in small sizes. In one embodiment, the sensor may have a size of less than 1 cm$^3$, although the sensor can also be smaller or larger. The size of the sensor may depend on the environment in which the sensor is deployed as well as the type of sensor.

In one example, embodiments of the sensor module interact with a biocorder that may be carried by a person. According to one embodiment, the biocorder can be carried and the sensor can communicate using wireless communications, allowing a user to walk through an area where sensors are deployed and automatically receive their collected data. The biocorder can also transmit to the sensors for various reasons such as recalibrating sensors, resetting sensors, provide new programming, and the like.

One embodiment of a biocorder is a device that can interact with sensors (transmit/receive data), process the data, store the data, and the like. The biocorder, for example, can be included in a cellular telephone. If the cellular telephone is Bluetooth enabled, it can easily and automatically communicate with sensors that have a Bluetooth radio module. Also, the biocorder itself can include multiple and interchangeable sensing devices. A user can carry several sensors on their body and exchange them as needed to collect and record data.

A biocorder can have different communication capabilities that may include, GSM/GPRS, Bluetooth, etc. The software operating on the biocorder can facilitate the addition of new instruments or sensors. As described above, many of these sensors are interchangeable and as a result, there is no requirement that all of these sensors be connected at the same time.

The biocorder can therefore include or use various sensors that may include, by way of example, GPS sensors, weather related sensors (temperature, pressure, wind speed and direction, humidity, rain fall, solar radiation, UV sensor, and the like). The camera of the phone can function as another sensor to be used to collect digital data. The biocorder may include a directional microphone with telescopic guiding, digital recording, and ultrasound capabilities. The biocorder may include measuring sensors, for example laser based linear measurements (distance, derivational elements such as angles and heights). Spectral analysis and barcode reading for tagging are other potential aspects of a biocorder. In essence, the biocorder is a system for recording multiple types of data. The data can be recorded directly from the biocorder or the biocorder can interact with remote sensor modules as described herein to obtain the data recorded by those sensors.

Figure 8:
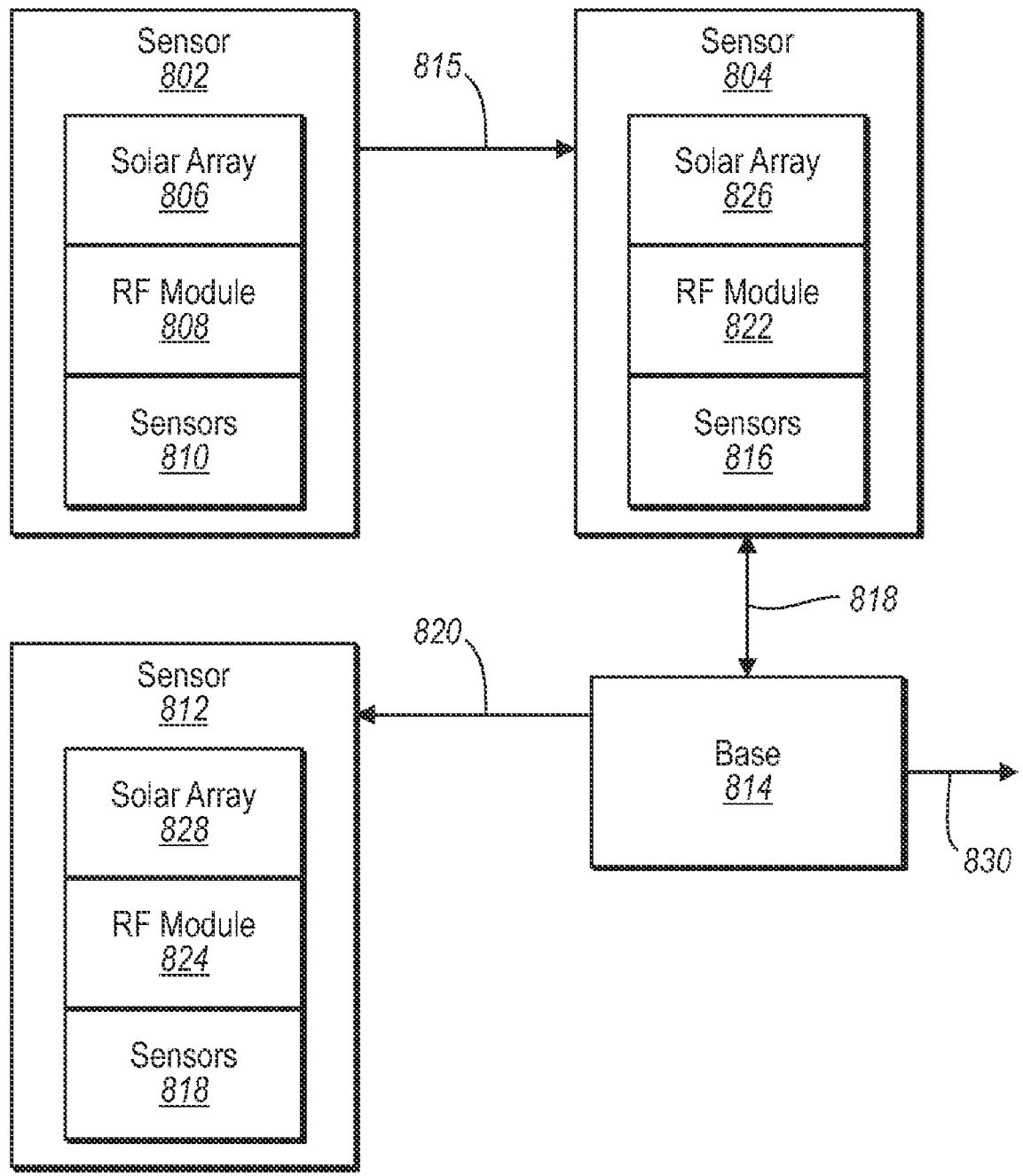
FIG. 8 illustrates one embodiment of sensors using a mesh network for data transmission, where the data transmission may use low power pulse modulation or ultra wide band.

FIG. 8 illustrates one embodiment of a system that can provide rapid communication for sensors that are deployed. Some of these sensors may be mobile (such as when mounted on a moveable object like a bird or other animal). In this example, the sensor modules 802, 804 and 812 are collecting data with the sensors 810, 816, and 818. Delivering the collected data to the base 814 is the goal in this example. The base 814 may be a biocorder that includes the components needed to communicate with the sensors 802, 804, and 812 as well as process or pre-process the collected data. The base 814 may be, by way of example, a hand held device, a laptop computer, and the like.

The RF links 815, 818, and 820 are Bluetooth links in this example but could be other types of wireless links. Bluetooth links (or other wireless links) provide speed, but typically have limited distance. The RF modules 808, 822, and 824 may have a transmission range on the order of 100 meters, for example. The transmission distance of a sensor module may be dependent on the frequencies used to transmit the data or the specific protocol as well as on the power available and provided by the power sources of the sensors. In this example, the power is provided by the solar arrays 806, 826, and 828. The sensors may also have batteries.

FIG. 8 also illustrates the ability to form small pico-nets or mesh networks. The sensor 802, for example, can transmit its data to the sensor 804 using the RF link 815. This data can be stored by the sensor 804 and then retransmitted to the base 814 using the RF link 818. The sensor 812, on the other hand, may be able to transmit directly to the base 814 directly over the RF link 820.

More generally, the sensors of the invention can be adapted to transmit and receive data or programming using mesh networks. A mesh network is decentralized and resilient because each sensor (or node) of the network only needs to transmit its data to another node. Typically, each sensor in the mesh network can communicate with several other sensors. Thus, the mesh network is resilient to the failure of specific sensors. Using mesh networks (which may be a mix of different kinds of wired and/or wireless networks), the collected data could be transmitted large distances that are well outside of the transmission distances of the individual sensors.

When the sensors are attached to mobile objects (such as birds or animals), then the collected data can be transmitted whenever another sensor is in range or detected or when another acceptable network is detected. Using the mesh network, the data can hop from one sensor to the next until it reaches its final destination. In order to achieve this goal, the data transmitted by a particular node should include some routing information. The routing method could also be optimized such that the fastest route is followed.

The base 814 may include another type of connection in addition to the wireless links illustrated in FIG. 8. The transmission 830 by the base station may utilize a terrestrial link (wired links, Internet link, satellite link) and thereby transmit the data over a larger distance. Thus, the base 814 can collect data from each of the sensor modules 802, 804 and 812. The base can then, in one example, process the data and transmit it over another network to a server for instance for storage or further processing.

Figure 9:
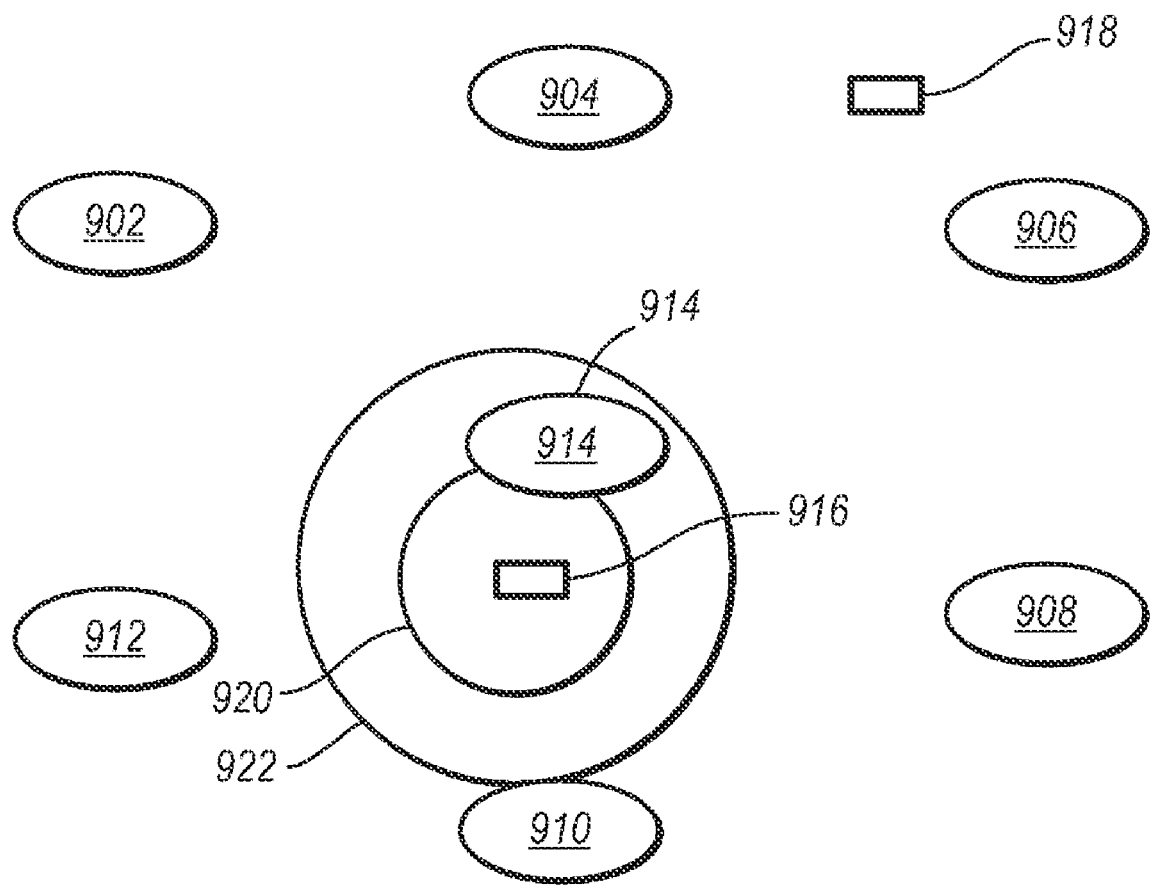
FIG. 9 illustrates another embodiment of sensors in a network where transmission includes lower data rates using low power pulse modulation to achieve longer transmission distances while using less power.

FIG. 9 illustrates another radio scheme that can be used to collect sensor data. In this embodiment, the system includes towers 902, 904, 906, 908, 910, 912, and 914. The sensors 916 and 918 are mounted or attached to a mobile object, such as an animal. Alternatively, the sensors in this system may also be immobile.

In this example, the sensors 916 and 918 use an ultra wide band. Ultra wide band (UWB), in one embodiment, refers to a radio scheme where the sensors 916 and 918 transmit short duration pulses. The data transmitted by the sensors 916 and 918 is therefore pulse modulated. As a result, the sensors 916 and 918 can communicate in existing communication bands without causing significant interference. In addition, the transmission distance increases, by way of example, to the order of 10 kilometers or more in contrast to the 100 meters achieved by Bluetooth wireless communications. Further, UWB communications require less power, thereby conserving the power of the individual sensors.

The embodiment of FIG. 9 can also incorporate the advantages of mesh networks. Due to the extended transmission range achieved with pulse modulation techniques in UWB systems, the data may be easier to collect. In addition, the transmission of the data can be used to track movement. For example, the transmission from the sensor 916 is first received by the tower 914 as indicated by the circle 920. The same transmission is received later in time at the tower 910, as indicated by the circle 922. This timing information from multiple towers can be used to track position and movement of the object 916. This may have applications, for example, in environmental applications, military applications, and the like where moving objects being monitored. The towers can then retransmit the data if necessary to another destination or with more power.

The following situations illustrate embodiments of the invention including sensor modules. These situations are by way of example only and one of skill in the art can appreciate that embodiments of the invention are not limited to these specific situations. Rather, these examples are instructive as they illustrate embodiments of the sensor modules as well as methods for using the sensor modules in various applications. The sensor modules can be IC sensor modules where appropriate, ceramic based sensor modules with flex circuits, or planar based sensor modules as described herein.

Figure 10:
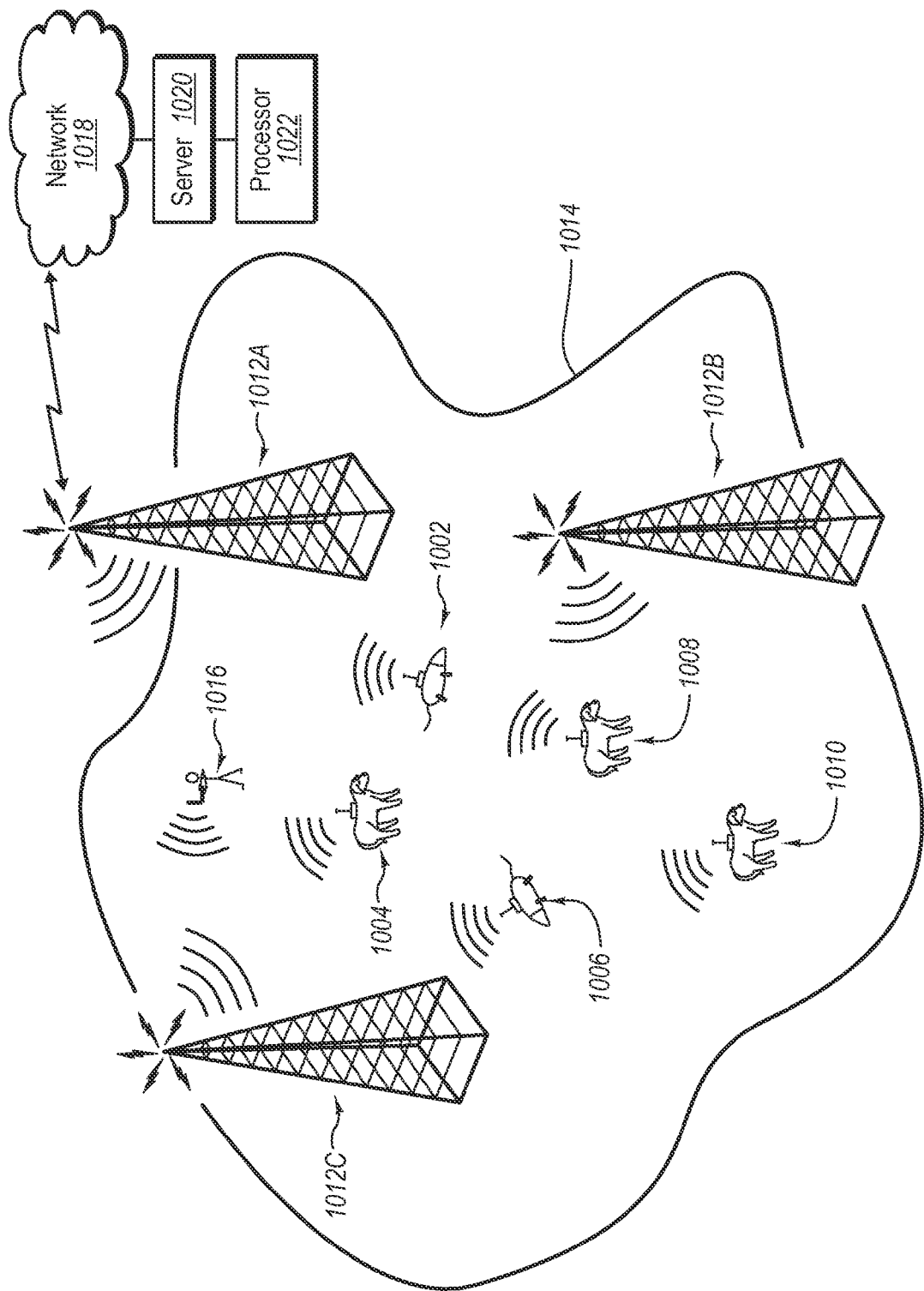
FIG. 10 illustrates an embodiment of the invention including sensor modules in a biology environment.

FIG. 10 illustrates one embodiment of the present invention which may be useful in a biology situation. In such environments, the sensor platform for one or more sensor modules may include a color sensor, an acceleration sensor, a temperature sensor, a Bluetooth radio module, and battery and solar cell power sources. According to one embodiment the sensors may be adapted to collect and transmit information useful in monitoring animals and their surroundings. In FIG. 10, a number of sensors (1002-1010) are placed on a series of animals within a specific area 1014. Radio towers 1012A-C positioned throughout the area 1014 are able to receive signals from the sensors (1002-1010) and transmit the information to a network 1018 including a server 1020 and a processor 1022 capable of using telemetry software to determine the relative positions of the sensors (1002-1010) in the area 1014. This information may then be transmitted to a person operating a biocorder 1016 in the area 1014. Over time, the typical on board storage in each sensor may contain a certain time period of storage (30 days worth of data, for example). The data can be captured by a user simply walking through the site being monitored by the sensor modules with a biocorder.

As a person 1016 walks through the cite 1014 with a base or a biocorder, the sensors use the Bluetooth radio to transmit their stored information to the biocorder. The memory of the sensors can be cleared and the sensors can begin storing data again. As previously indicated, the sensors could be arranged in a small pico mesh network. This ensures that all of the sensors can transmit their data to the biocorder even when the user may not walk close enough to a particular sensor.

In an aquarium environment, the sensor platform in the sensing plane of the sensor module may include a PH sensor, a resistance sensor, a temperature sensor. The communication module may include a Bluetooth radio that is powered by a battery and/or a solar panel. The sensor module is inserted into the aquarium and measures PH and salinity, listens for pump cycling, monitors water temperature and temperature history, and monitors water quality. The information collected by the sensor module can be transmitted to a user's cellular telephone or desktop computer, for example. The user can also reprogram the sensor module as needed. For example, the user may change the settings at which an alert from a change in water temperature is generated and transmitted. In addition to merely collecting data, the sensor modules described herein can also be proactive and generate alerts when certain data exceeds predetermined threshold values.

The sensor modules described herein can be adapted for use in boat or other vehicle security systems. The sensors may include multiple on/off switches and a microphone. Of course, the sensor modules can include other sensors as well. The sensor module also includes Bluetooth radio. In this example, a boat is tied up to a dock to complete a circuit using one of the on/off switches. The engine of the boat is also tied to radio control. The system can be activated by a user's cell phone. Thus, the user transmits activation commands to the sensor module.

When the rope is untied, the circuit is broken, and the sensor can then activate security by, for example disarming the engine using the Bluetooth radio. The sensor module therefore senses when the boat is untied and can use the radio to take security measures. Using a mesh network, a call for assistance can also be made to a remote location. The user can also deactivate the security with the cell phone.

In a prosthetic limb environment, the sensor module typically includes a fiber Bragg grating (FBG) sensor with optics, a battery and a Bluetooth radio. The sensor monitor stress periodically, stores the data, and reports on request or periodically. The data can be transmitted to a cell phone or a computer browser as described herein.

A sensor for an ocean platform may include sensors that enable the reception and transmission of optical data. This sensor may include an optical tether as described above. The sensor can be mounted underwater and can monitor platform anchors or other underwater conditions depending on the sensors included in the sensor module. The device can be remotely powered using an optical signal and can be read using the optical signal as well. Alternatively, the sensor module may be connected to a surface device that can interact optically with the sensor and retrieve and store the data generated by the sensor. A user can then approach the surface device and extract the data wirelessly as described above or by inserting a flash drive, for example.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A sensor module comprising:
   a power plane that includes a power source and a communications module;
   a processing plane including a processor and memory, the processing place in electrical and mechanical communication with the power plane with a first flex circuit that extends from the power to the processing plane such that a portion of the first flex circuit is exterior to the power plane and the processing plane;
   a sensing plane that includes one or more sensors, the sensing plane in mechanical and electrical communication with the processing plane with a second flex circuit that extends from the processing to the sensing plane such that a portion of the second flex circuit is exterior to the processing plane and the sensing plane; and
   wherein the flex circuits permit the power plane, processing plane, and sensing plane to fold into a stacked package.

2. A sensor module as defined in claim 1, wherein the one or more sensors are selected for one or more of:
   a biology environment;
   an aquarium;
   an optical identifier;
   a security system;
   a prosthetic limb; and
   an ocean platform.

3. A sensor module as defined in claim 1, wherein the one or more sensors is comprised of a color, acceleration, temperature, pH, resistance, microphone, salinity, light, or fiber Bragg grating sensor with optics.

4. A sensor module as defined in claim 1, wherein the communications module comprises a Bluetooth radio and wherein the communications module is adapted to function as a node of a mesh network.

5. A sensor module as defined in claim 1, wherein the communications module comprises a radio that is configured to transmit using pulse modulation over a distance on the order of 10 kilometers.

6. A sensor module as defined in claim 5, wherein the communications module transmits data to a biocorder when the biocorder contacts the sensor and requests data.

7. A sensor module as defined in claim 6, wherein the biocorder communicates data or programming with the sensor module.

* * * * *